United States Patent
Hohmann, Jr.

(10) Patent No.: US 11,130,168 B2
(45) Date of Patent: Sep. 28, 2021

(54) COLD FORMED, DUAL SEAL ANCHOR AND METHOD OF MAKING

(71) Applicant: Columbia Insurance Company, Omaha, NE (US)

(72) Inventor: Ronald P. Hohmann, Jr., Hauppauge, NY (US)

(73) Assignee: Hohmann & Barnard, Inc., Hauppauge, NY (US)

( * ) Notice: Subject to any disclaimer, the term of this patent is extended or adjusted under 35 U.S.C. 154(b) by 0 days.

(21) Appl. No.: 16/456,152

(22) Filed: Jun. 28, 2019

(65) Prior Publication Data

US 2020/0001350 A1    Jan. 2, 2020

Related U.S. Application Data

(60) Provisional application No. 62/692,406, filed on Jun. 29, 2018.

(51) Int. Cl.
| | |
|---|---|
| *B21K 23/04* | (2006.01) |
| *E04B 1/76* | (2006.01) |
| *F16B 35/06* | (2006.01) |
| *E04B 1/41* | (2006.01) |
| *E04F 13/08* | (2006.01) |

(52) U.S. Cl.
CPC ............ *B21K 23/04* (2013.01); *E04B 1/4178* (2013.01); *E04B 1/7616* (2013.01); *E04B 1/7637* (2013.01); *F16B 35/06* (2013.01); *E04F 13/0821* (2013.01)

(58) Field of Classification Search
CPC .... E04B 1/4178; E04B 1/7637; E04B 1/7616; E04B 13/0821; B21K 23/04; F16B 35/06
See application file for complete search history.

(56) References Cited

U.S. PATENT DOCUMENTS

| | | | |
|---|---|---|---|
| D218,017 S * | 7/1970 | Brown | D8/387 |
| 4,724,694 A * | 2/1988 | Medal | B21K 1/56 470/10 |
| 8,726,597 B2 * | 5/2014 | Hohmann, Jr. | E04B 1/4178 52/379 |
| 8,910,445 B2 | 12/2014 | Hohmann, Jr. | |
| 9,140,001 B1 * | 9/2015 | Hohmann, Jr. | E04B 1/7629 |
| 9,260,857 B2 | 2/2016 | Hohmann, Jr. | |
| 9,334,646 B2 | 5/2016 | Hohmann, Jr. | |
| 9,758,958 B2 * | 9/2017 | Hohmann, Jr. | E04B 1/7629 |
| 9,803,355 B1 * | 10/2017 | Ripley | E04B 1/7616 |
| 9,989,082 B2 * | 6/2018 | Rodenhouse | F16B 43/001 |
| 10,100,866 B2 * | 10/2018 | Champney | F16B 31/06 |
| 10,202,754 B2 | 2/2019 | Hohmann, Jr. | |
| 2006/0051182 A1 * | 3/2006 | Jakuszeski | F16B 43/00 411/353 |
| 2008/0141605 A1 * | 6/2008 | Hohmann | F16B 41/00 52/408 |
| 2008/0260492 A1 * | 10/2008 | Townsend | F16B 35/041 411/366.1 |

(Continued)

*Primary Examiner* — Andrew J Triggs
(74) *Attorney, Agent, or Firm* — Stinson LLP

(57) ABSTRACT

A cold formed anchor for use in an insulated cavity wall includes a unitary body formed with a driver portion and having large and small diameter portions. The driver portion may be formed with structure for connecting a veneer tie to the anchor. A method of making the cold formed anchor includes cold forming a driver portion and a reduced diameter portion from a blank.

10 Claims, 2 Drawing Sheets

(56) References Cited

U.S. PATENT DOCUMENTS

| | | | |
|---|---|---|---|
| 2009/0226251 A1* | 9/2009 | Ollis | E04C 5/163 403/408.1 |
| 2012/0304576 A1* | 12/2012 | Hohmann, Jr. | E04B 1/4178 52/513 |
| 2014/0075855 A1* | 3/2014 | Hohmann, Jr. | E04B 1/4178 52/167.1 |
| 2020/0001350 A1* | 1/2020 | Hohmann, Jr. | F16B 25/103 |

* cited by examiner

COLD FORMED, DUAL SEAL ANCHOR AND METHOD OF MAKING

CROSS-REFERENCE TO RELATED APPLICATIONS

This application claims the benefit of U.S. Provisional Application No. 62/692,406, filed Jun. 29, 2018, the entire contents of which are hereby incorporated by reference.

FIELD OF THE INVENTION

The present invention generally relates to a wall anchor used in a facade support system of a building, and more specifically, to a method used to create the wall anchor.

BACKGROUND

A facade can be a durable and aesthetically desirable construction for a building exterior. Facades, such as brick or stone veneer walls, also provide protection to the interior of the building from the surrounding environment. Anchoring systems, such as veneer ties, are used to secure facades to inner walls of a building to overcome forces which might pull the facade away from the building. These anchoring systems extend from the inner wall of the building to the facade. Generally, anchoring systems, such as veneer ties are connected to the inner wall with a wall anchor or fastener, which is secured to the inner wall. Generally, veneer ties have one end secured to the wall anchor and the other end secured to the facade to prevent the facade from moving relative to the inner wall.

SUMMARY

In one aspect, a method of making an anchor for use in an insulated cavity wall, the method generally comprises cold forming a driver portion of the anchor out of a length of metal at a distal end of the length of metal. The driver portion is configured to be engaged to drive the anchor into an inner wythe of the insulated cavity wall. A reduced diameter portion is cold formed out of the length of metal at a proximal end of the length of metal where the proximal end is opposite the distal end.

In another aspect, a cold formed anchor for use in an insulated cavity wall, the anchor generally comprises a unitary body formed with a driver portion configured to be engaged to drive the anchor into an inner wythe of the insulated cavity wall. A large diameter barrel portion extends from the driver portion. A small diameter barrel portion is configured to be driven into the inner wythe of the insulated cavity wall and a transition portion is located between and interconnects the large diameter barrel portion and the small diameter barrel portion.

Other objects and features of the present invention will be in part apparent and in part pointed out hereinafter.

BRIEF DESCRIPTION OF THE DRAWINGS

Corresponding reference characters indicate corresponding parts throughout the drawings.

DESCRIPTION

Figure 1:
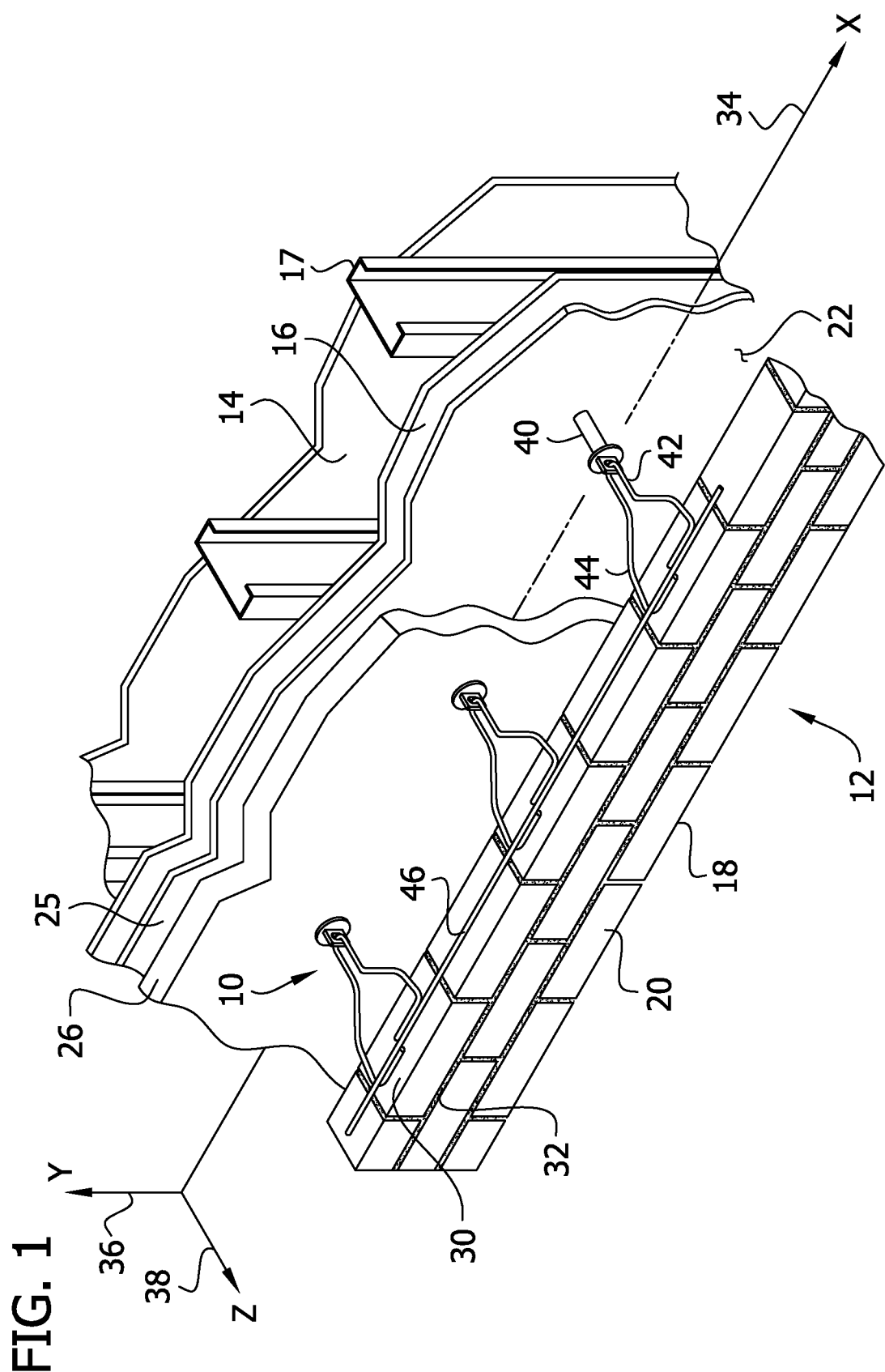
FIG. 1 is a perspective of an anchoring system as applied to a cavity wall with an inner wythe and outer wythe, the anchoring system including several wall anchors.

Referring now to FIG. 1, an anchoring system constructed according to one embodiment of the present disclosure is generally indicated by reference numeral 10. The anchoring system 10 comprises a wall anchor 40, an interengaging veneer tie 44, and a veneer (outer wythe) reinforcement 46. The anchoring system 10 is disposed in a cavity wall structure 12. The cavity wall structure 12 is shown having an inner wythe or drywall backup 14 with sheetrock or wall board 16 mounted on metal studs or columns 17 and an outer wythe or facade 18 of brick 20 construction. Between the inner wythe 14 and the outer wythe 18, a cavity 22 is formed. An air/vapor barrier 25 is attached to the exterior surface of the wallboard 16. Insulation 26 is disposed within the cavity 22. The air/vapor barrier 25 and the wallboard 16 together form the exterior layer of the inner wythe 14, the exterior layer has the insulation 26 disposed thereon (e.g., the cavity wall structure is an insulated cavity wall). It will be understood that the cavity wall may have other constructions besides the illustrated construction within the scope of the present disclosure. For example, the inner wythe 14 may including wooden studs (not shown) or the inner wythe may be of concrete or concrete block construction. In another example, the cavity wall may have an insulative layer of 1 to 8 inches (2.5 to 20 cm) (approx.) and a total span of 1.75 to 8.75 inches (4.5 to 22 cm) (approx.). The anchoring system 10 interconnects the inner and outer wythes 14, 18. As shown in FIG. 1, the cavity wall structure 12 includes a plurality of anchoring systems 10.

The outer wythe 18 includes successive bed joints 30 and 32 that are substantially planar and horizontally disposed and, in accord with building standards, are 0.25 to 0.50 inches (0.6 to 1.3 cm) (approx.) in height. Selective ones of bed joints 30 and 32, which are formed between courses of bricks 20, receive the insertion portion of the veneer tie 44. Being threadably mounted in the inner wythe 14, the wall anchor 40 is supported thereby and, as described in greater detail herein below, is configured to minimize air and moisture penetration around the wall anchor/inner wythe interface.

For purposes of discussion, the exterior surface of the air/vapor barrier 25 contains a horizontal line or x-axis 34 and intersecting vertical line or y-axis 36. A horizontal line or z-axis 38, normal to the xy-plane, passes through the coordinate origin formed by the intersecting x- and y-axes. The veneer tie 44 is shown with a U-shaped rear leg portion 42 used to connect the veneer tie to the wall anchor 40. The wall anchor 40, while shown as a unitary structure of high-strength steel may be manufactured as an assemblage of several distinct parts.

The veneer tie 44 is adapted from one shown and described in Hohmann, U.S. Pat. No. 4,875,319 which patent is incorporated herein by reference. The veneer tie 44 is shown in FIG. 1 as being emplaced on a course of bricks 20 in preparation for embedment in the mortar of bed joint 30. In this embodiment, the anchoring system 10 includes a wire or outer wythe reinforcement 46, the wall anchor 40 and the veneer tie 44. The wire reinforcement 46 is constructed of a wire formative conforming to the joint reinforcement requirements of ASTM Standard Specification A951-00. The veneer tie 44 may have other constructions within the scope of the present disclosure.

At intervals along the inner wythe 14, wall anchors 40 are driven into place in anchor-receiving channels (e.g., holes) that extend through the wall board 16 and insulation 26. The wall anchors 40 are positioned on or within the inner wythe 14 so that the longitudinal axis of the wall anchor is normal to an xy-plane and taps into stud 17.

Figure 2A:
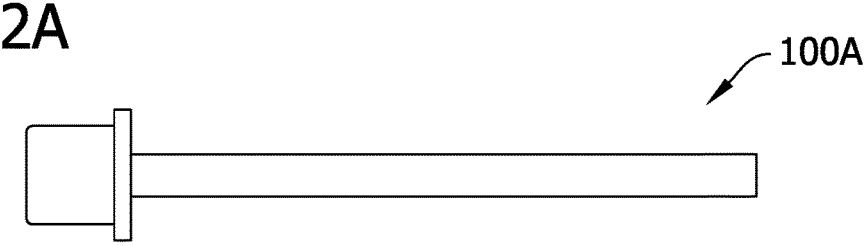
FIGS. 2A-2E illustrate the steps for forming the wall anchor according to one embodiment of the present disclosure.
Figure 2B:
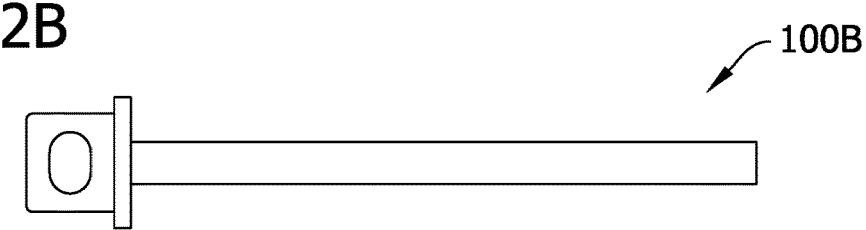
Figure 2C:
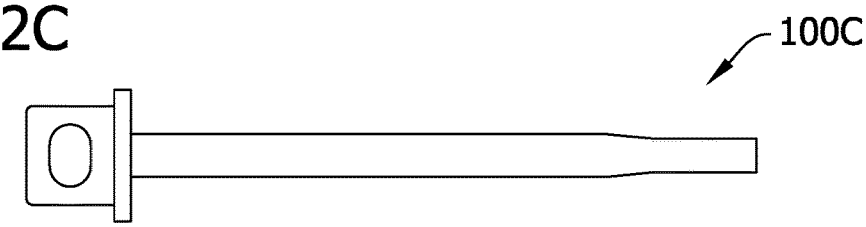
Figure 2D:
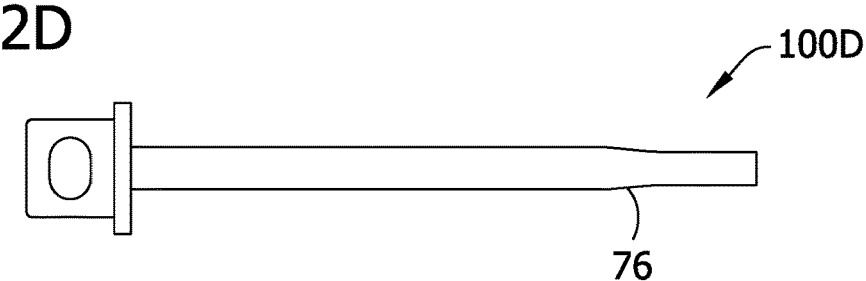
Figure 2E:
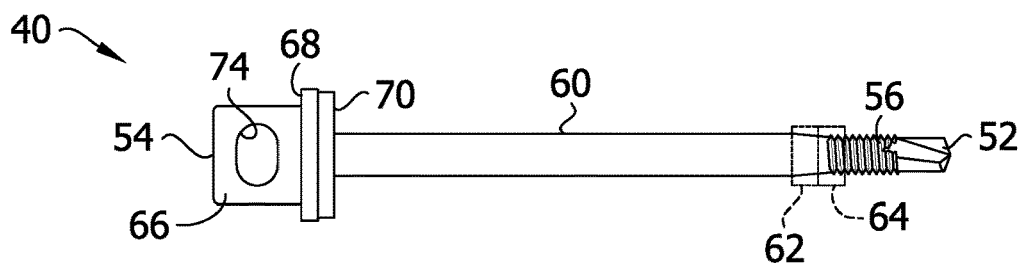

Referring now to FIG. 2E, the wall anchor 40 extends from a driven end 52 (e.g., proximal end) to an opposite, driver end 54 (e.g., distal end). A small diameter barrel portion 56 of the wall anchor adjoins (e.g., defines, extends distally from) the driven end 52. The small diameter barrel portion 56 is configured to be driven into the inner wythe 14 of the insulated cavity wall 12. The small diameter barrel portion 56 may be externally threaded, which enables the wall anchor 40 to threadably engage the inner wythe 14, specifically one of the studs 17. In the illustrated embodiment, the wall anchor 40 includes a self-tapping tip at the driven end 52. A larger diameter barrel or shaft portion 60 is located closer to the driver end 54 than the small diameter portion 56. A transition portion 76 (FIG. 2D) extends between and interconnects the barrel portions 56 and 60. The transition portion 76 provides a smooth transition between the different diameters of the barrel portions 56, 60 which is believe to minimize any damage to the inner wythe 14 that may be caused by driving the wall anchor 40 into the inner wythe. In the illustrated embodiment, the transition portion 76 has a conical frustum shape, although other shapes are within the scope of the present disclosure. At or at some location along the transition portion 76 (e.g., at the juncture of barrel portions 56 and 60), a flange 62 is disposed. The flange 62 extends radially outward from the transition portion 76 and is configured to engage a portion of the inner wythe 14 to form a fluid tight seal therewith. In the illustrated embodiment, a stabilizing neoprene fitting or internal seal 64 abuts the flange 62. The internal seal 64 may be mounted on or secured to the flange 62 or the internal seal may be mounted on the large diameter barrel portion 60 and contact (e.g., engage) the flange 62. The seal 64 abuts a distal face of the flange 62. The seal 64 is configured to engage a portion of the inner wythe 14 and form the fluid tight seal therewith. When fully driven into stud 17 the threaded small diameter portion 56 of wall anchor 40 pierces sheetrock or wallboard 16 and air/vapor barrier 25. The seal 64 engages the air/vapor barrier 25 and the transition portion 76, and covers the insertion point precluding air and moisture penetration therethrough and maintaining the integrity of barrier. Further, the flange 62 may act as a stop that engages a portion of the inner wythe 14, such as the air/vapor barrier 25, to prevent the wall anchor 40 from being driven to far into the inner wythe.

At the driving end 54, a head or driver portion 66 adjoins the large diameter barrel or shaft portion 60. The driver portion 66 is configured to be engaged, such as by a tool, to drive the wall anchor 40 into the inner wythe 14 of the insulated cavity wall. The large diameter barrel portion 60 extends distally from the driver portion 66. The driver portion 66 is also configured to be secured to or receive a veneer tie 44. In the illustrated embodiment, the driver portion 66 defines an aperture 74 sized and shaped to receive a portion (e.g., the leg portion 42) of the veneer tie 44. In this manner, the veneer tie 44 and wall anchor 40 can be connected together.

The wall anchor 40 includes a flange 68 is disposed at the connection between the driver portion 66 and the large diameter barrel portion 60 (broadly, the flange is part of the driver portion). The flange 68 extends radially outward from the large diameter barrel portion 60. The flange 68 is configured to engage the insulation 26 of the inner wythe 14 to form a fluid tight seal therewith. In the illustrated embodiment, a stabilizing neoprene fitting or external seal 70 abuts the flange 68. The external seal 70 may be mounted on or secured to the flange 68 or the external seal may be mounted on the small diameter barrel portion 56 and contact (e.g., engage) the flange 68. The seal 70 abuts a proximal face of the flange 68. The seal 70 is configured to engage a portion of the inner wythe 14 and form the fluid tight seal therewith. Upon installation into the rigid insulation 26, the larger barrel portion 60 is forced into a press fit relationship with anchor-receiving channel that extends through the insulation. Stabilization of this stud-type wall anchor 40 is attained by barrel portion 60 and internal seal 64 completely filling within the channel, with the external seal 70 capping the opening or entry of the channel by engaging the exterior surface of the insulation 26 (FIG. 1), securing the wall anchor in place. This arrangement does not leave any wiggle room for pin-point loading of the wall anchor 40. With a stabilizing fitting (e.g., external seal 70) in place, the insulation integrity within the cavity wall 12 is maintained.

Referring now to FIGS. 2A-2E, a process for forming the wall anchor 40 is shown, with the completed or finished wall anchor shown in FIG. 2E. The wall anchor 40 is formed as a one-piece component. In other words, the wall anchor 40 has a unitary body. The wall anchor 40 may be formed from steel coil of a certain diameter, such as 0.2 inches (5.3 mm). In other words, in one embodiment, the wall anchor 40 may be formed from a length of material (e.g., a blank), such as a length of metal or other suitable material, having a generally circular cross-sectional shape. Preferably, the diameter of the length of material matches or closely matches a final dimension of at least one portion of the wall anchor 40, in order to reduce or minimize the number of steps required to form the wall anchor. Generally, the wall anchor 40 is created by cold forming. Cold forming includes one or more of stamping, squeezing, shearing, drawing, punching and bending. Using one or more of these processes, individually or at the same time, the blank is shaped to form the wall anchor 40. Cold forming is done in steps or stages, with each step shaping the blank until the wall anchor 40 is formed. For example, one or more of the steps may include pressing the blank between dies to force the blank or a portion thereof into a specific shape. Cold forming generally occurs while the material being worked or shaped (e.g., the blank) is at or near room temperature.

In the first step, a section of the steel coil is cut off to form a blank (e.g., a length of material having a circular cross-section, such as a rod) used to make the wall anchor 40. Next, the driver portion 66 is cold formed out of the length of material (e.g., the blank) at a distal end of the length of material (e.g., metal). In this step, the flange 68 may also be formed (e.g., the flange 68 and driver portion 66 are generally formed simultaneously). In other words, the blank is cold formed to form the flange 68 adjacent to the driver portion 66. In one embodiment, the driver portion 66 and flange are formed in a sequence of stamping operations. The shape of the blank 100A after this step is illustrated in FIG. 2A. Next, the formation of the driver portion 66 is completed by forming (e.g., cold forming) an aperture 74 in the driver portion. This may be done by cutting and removing (e.g., punching) a portion of the blank 100A to form the aperture 74. The shape of the blank 100B after this step is illustrated in FIG. 2B.

Next, a reduced diameter portion (e.g., small diameter barrel portion 56) is cold formed out of the blank 100B (e.g., length of material) at the distal end of the blank. In particular, a proximal end portion of the blank 100B is compressed to begin formation of the small diameter barrel portion 56. At the same time, the transition portion 76 (broadly,) begins to be cold formed out of the blank 100B. This may also be done by compressing the portion of the blank 100B. The shape of the blank 100C after this step is illustrated in FIG. 2C. Before the completion of the formation of the wall anchor 40 from the blank, the transition portion 76 (or more specifically, the portion of the blank that will make up the transition portion) is, broadly, the intersection of the reduced diameter portion of the length of material and the remainder of the length of material. Moreover, it is understood that all the parts of the blank, at any step of the cold forming process, may be referred to as portions, sections, remainders, segments, lengths, etc. before said parts of the blank are formed into the components of the wall anchor 40.

Next, further compression (broadly, cold forming) is applied to the blank 100C to form the small diameter barrel portion 56 and the transition portion 76 into their final dimensions and shapes. The shape of the blank 100D after this step is illustrated in FIG. 2D. In one embodiment, the initial diameter of the blank matches the diameter of the large diameter barrel portion 60 such that no portion of the blank needs to be shaped by cold forming to form the large diameter barrel portion. In other embodiments, the large diameter barrel portion 60 is cold formed out of the length of material (e.g., the remainder of the length of material not used to form the small diameter barrel portion 60 and transition portion 76), such as by compressing a portion of the blank. This may be similar to the way the small diameter barrel portion 56 is formed. If the large diameter barrel portion 60 is cold formed, the cold forming of the large diameter barrel portion may occur before, simultaneously with or after the formation of the small diameter barrel portion 56 and transition portion 76. Generally, the size and shape of the blank 100D generally corresponds to the size and shape of the wall anchor 40 after this step (e.g., the driver portion 66, flange 68, large diameter barrel portion 60 and transition portion 76 are all completely formed). It will be understood that a greater or fewer number of cold forming steps may be used to give the wall anchor 40 its final shape and size and such greater or fewer steps are within the scope of the present disclosure. Moreover, the steps may be conducted in a different order.

Next, the external threads are formed (e.g., cold formed) on the reduced diameter portion of the blank 100D to complete the formation of the small diameter barrel portion 56. In one embodiment, the reduced diameter portion is cut to form threads. In another embodiment, the external threads are formed by rolling. Moreover, the self-tapping tip of the wall anchor 40 is formed (e.g., cold formed) at the proximal end of the reduced diameter portion. This may occur before or after the threads are formed on the reduced diameter portion. Next, in the illustrated embodiment, a washer is applied (e.g., attached) to the transition portion (e.g., the washer is attached to the length of material generally at the intersection of the reduced diameter portion of the length of material and the remainder of the length of material). The washer forms the flange 62. Accordingly, in the illustrated embodiment, the flange 62 is not formed from the blank but is a separate piece of material attached to the blank 100D. In other embodiments, the flange 62 may be formed from the blank, similar to the formation of flange 68. In other words, flange 62 being formed as one piece out of the blank is within the scope of the present disclosure. Finally, if included, the external seal 70 is positioned to abut against a distal surface of the flange 68 (e.g., mounted on the blank) and the internal seal 64 is positioned to abut against the flange 62. As this point, as shown in FIG. 2E, the formation of the wall anchor 40 is finished and the wall anchor is ready to be used in an anchoring system, as shown in FIG. 1. Although a certain order of steps is described herein, the order could be varied as will be understood by those of ordinary skill in the art.

Having described the invention in detail, it will be apparent that modifications and variations are possible without departing from the scope of the invention defined in the appended claims. For example, where specific dimensions are given, it is understood these dimensions are illustrative and other dimensions are within the scope of the present disclosure.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above products and methods without departing from the scope of the invention, it is intended that all matter contained in the above description shall be interpreted as illustrative and not in a limiting sense.

What is claimed is:

1. A method of making an anchor for use in an insulated cavity wall, the method comprising:
    cold forming a driver portion of the anchor out of a length of metal at a distal end of the length of metal, the driver portion configured to be engaged to drive the anchor into an inner wythe of the insulated cavity wall;
    cold forming a reduced diameter portion of the length of metal at a proximal end of the length of metal, the proximal end opposite the distal end;
    cold forming a large diameter barrel portion out of the length of metal;
    cold forming a transition portion out of the length of metal, the transition portion extending between and interconnecting the large diameter barrel portion and the reduced diameter barrel portion;
    attaching a washer on the transition portion; and
    abutting a washer seal against a distal face of the washer, the seal configured to engage a portion of the inner wythe and form a fluid tight seal therewith.

2. The method of claim 1, wherein at least one of the cold forming, the driver portion, the reduced diameter portion, the large diameter barrel portion and the transition portion includes one or more of stamping, squeezing, shearing, drawing, punching and bending.

3. The method of claim 1, further comprising cold forming a first flange adjacent to the driver portion.

4. The method of claim 3, further comprising cold forming an aperture in the driver portion configured to receive a veneer tie.

5. The method of claim 4, further comprising abutting a flange seal against a distal face of the first flange, the seal configured to engage a portion of the inner wythe and form a fluid tight seal therewith.

6. The method of claim 1, wherein the transition portion has a conical frustum shape.

7. The method of claim 1, wherein the length of metal has a circular cross-sectional shape.

8. The method of claim 1, further comprising cutting the length of metal from a metal coil.

9. The method of claim 1, further comprising forming threads on the reduced diameter portion.

10. The method of claim 1, wherein the transition portion tapers between the large diameter barrel portion and the reduced diameter barrel portion.

* * * * *